United States Patent [19]

Geri

[11] 3,860,191

[45] Jan. 14, 1975

[54] MARKING GUN TAPE SUPPLY

[75] Inventor: Don W. Geri, Mountain View, Calif.

[73] Assignee: Primark Corporation, Union City, Calif.

[22] Filed: Sept. 5, 1972

[21] Appl. No.: 286,124

[52] U.S. Cl. .............................. 242/68.5, 287/53 SS

[51] Int. Cl. .............................................. B65h 75/02

[58] Field of Search ................. 242/68.5, 68.1, 68.3; 287/103 A, 53 SS

[56] References Cited

UNITED STATES PATENTS

| | | | |
|---|---|---|---|
| 2,643,581 | 6/1953 | Wehrenfennig | 287/103 A |
| 3,106,363 | 10/1963 | Epstein | 242/68.5 |
| 3,312,410 | 4/1967 | Strothmann | 242/68.5 |
| 3,722,929 | 3/1973 | Gilman | 242/68.3 |

*Primary Examiner*—John W. Huckert
*Assistant Examiner*—Edward J. McCarthy
*Attorney, Agent, or Firm*—Limbach, Limbach & Sutton

[57] ABSTRACT

An improved tape supply for storing adhesive labels in a roll with a portable adhesive label marking gun, the tape supply comprising a cylindrical core having an outer surface on which an adhesive label tape is wound, and an axially concentric inner bore having three keyways asymmetricllly disposed around the periphery of the bore for cooperation with a mounting spud on the marking gun, the spud having three tabs at its distal end which correspond to three keyways in the bore for retaining the core on the spud.

5 Claims, 4 Drawing Figures

MARKING GUN TAPE SUPPLY

BACKGROUND OF THE INVENTION

This invention relates to an improved adhesive label tape supply for use in an adhesive label printer of the type shown in the patent application of William Martin, Ser. No. 134,346, filed Apr. 15, 1971, now abandoned.

Inexpensive portable marking guns of the type shown in the referenced application carry a supply of pre-cut adhesive labels on a roll of backing tape within the printer. The tape is wound on a core and incrementally advanced with each printing of a label. In a portable marking gun the tape supply must be easily replaceable when exhausted. To facilitate replacement, the tape and core are replaced as a unit and the old core discarded.

A core arrangement as disclosed in the referenced application, while having the advantage of insuring proper orientation of the tape in the marking gun, has the disadvantage of falling or popping out when, for example, the cover is removed for an inspection of the tape supply. Additionally, it is found that the unrestrained rotation of a spindle-type core having a boss and bearing recess arrangement allows the tape supply to partially unwind causing possible interference with the operation of the marking gun. In this respect it is found preferable to have the tape in tension throughout its transport in the printer to insure accurate coordination between the various elements which act on the tape, particularly the drive mechanism and the printing mechanism. It is thus desirable to construct a core which co-acts with a structure on the marking gun to generate a frictional drag on the core causing a tension in the tape when it is drawn from the tape supply.

SUMMARY OF THE INVENTION

The improved tape supply of this invention comprises a cylindrical core on which an adhesive label tape is wound, the core having a central bore with asymmetrically arranged keyways for oriented placement on a spindle or spud in a marking gun. The spud is formed with a plurality of flexible prongs having a tab at their distal end corresponding in arrangement to the keyways in the core. The tab on the prongs collectively form a flange for retaining the core on the spud once the core is properly oriented and placed thereon. Thus, the core can deliberately or accidentally be removed only when the arrangement of the keyways is coincident with the arrangement of the tabs.

To inhibit unrestrained unwinding of the tape on the core, a frictional drag is provided between the spud and core by flaring the prongs outwardly to create an effective outside diameter slightly larger than the diameter of the bore in the core. The forced retraction on placement of the core creates a moderate friction preventing unrestrained unwinding of the tape and therefore a tension in the tape when drawn from the core.

An additional feature of the improved tape supply is a peripheral notching of the outer periphery of the core such that one core can be stacked on another core in interlocking fashion. This feature facilitates the initial factory winding of the tape on the cores by permitting a large plurality of cores to be interlocked on an elongated jig or mandrel and simultaneously rotated and wound.

DETAILED DESCRIPTION OF THE PREFERRED EMBODIMENT

Figures 1, 2:
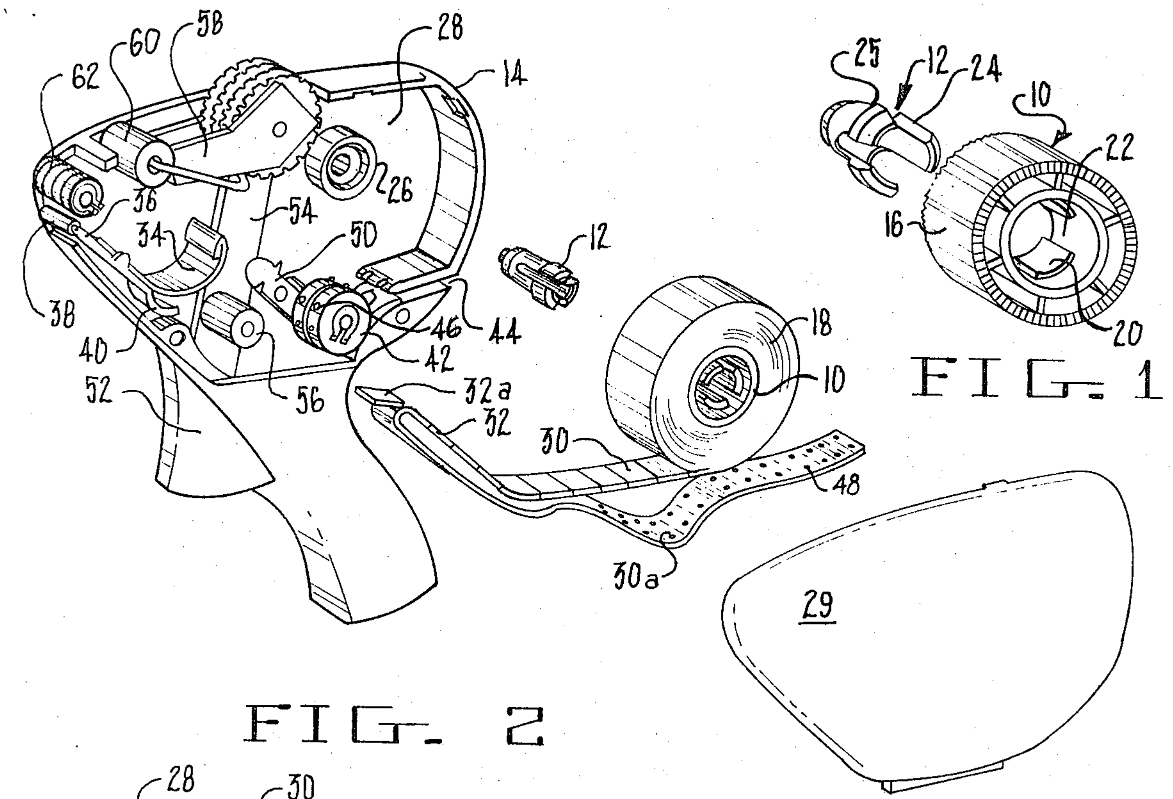
FIG. 1 is a front perspective view of an improved tape supply core and supporting structure.
FIG. 2 is an exploded view of the tape supply and a label marking gun.

Referring to the perspective view of FIG. 1, an improved tape supply core 10 is shown with a supporting structure comprising a spindle or spud 12 for mounting the core 10 in a marking gun 14 of the type illustrated in FIG. 2. The core 10 has a cylindrical outer surface 16 on which a tape supply 18 is carried as shown in FIG. 2. The core 10 is constructed of a suitable plastic material in an injection molding process and is formed with an inner bore 20 having three keyways 22 which are asymmetrically arranged around the bore 20. The supporting structure or spud 12 is also constructed of a suitable plastic material in an injection molding process and has three tabs 24 on the distal or free end of three prongs 25 which are arranged to position the tabs coincident with the keyways 20 in the core when the core is properly oriented with respect to the spud. In this orientation the core may be inserted on the spud and rotated thereon. To remove the core, the core must again be selectively oriented with respect to the spud and thus withdrawn. The likelihood of accidental removal is therefore reduced to a minimum since coincident orientation occurs only once in a complete revolution of the core.

The manner in which the tape supply 18 is contained within the marking gun 14 is illustrated in FIG. 2. The spud 12 is fixed to the center of a bearing surface 26 on the inner wall of an enclosed casing 28. When a cover 29 of the casing is removed, the core 10 and marking tape 30 of the tape supply are insertable on the spud 12 and threaded through the marking gun in the representative manner shown. The tape 30 including pre-cut labels 32 stuck thereon are threaded under a tension spring 34 over a printing plate 38 and around a guide tip roller 36 where the labels, as exemplified by label 32*a*, separate from the tape, being unable to negotiate the sharp switchback at the guide tip roller. The tape without the labels, designated 30a, continues over an adjustable plate 40, around a drive roller 42 and out an exit slot 44 in the casing. The adjustable plate varies the effective transport distance between the printing plate and the drive roller to allow adjustment of the position of the labels on the printing plate for proper printing. The drive roller 42 has radial teeth 46 which engage perforations 48 in the tape for incrementally moving the tape through the marking gun.

Incremental movement of the tape 30 is accomplished by a ratchet and pawl arrangement 50 which is connected to a trigger 52 by an elongated pivot arm 54. The pivot arm 54 pivots about post 56 and is also connected at its distal end to the printing head 58. When the trigger is squeezed the printing head swings across an inking roller 60 and impacts on the printing plate 36 on which a label is positioned. When the trigger is released the connected ratchet and pawl arrangement 50 incrementally rotates the drive roller 42 and partially ejects a label at the guide tip roller 38 by movement of the tape. The label can thus be wiped on an object to be marked and pressed thereon by a pressure roller 62.

Figure 3:
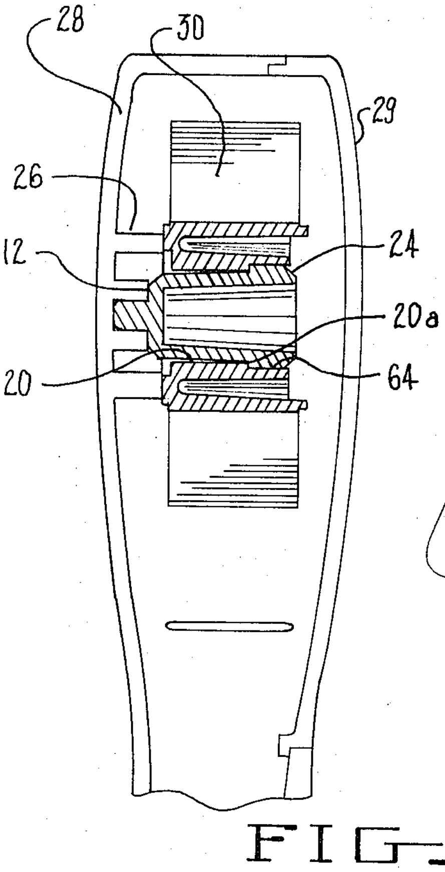
FIG. 3, is a side sectional view of the improved core and supporting structure.
Figure 4:
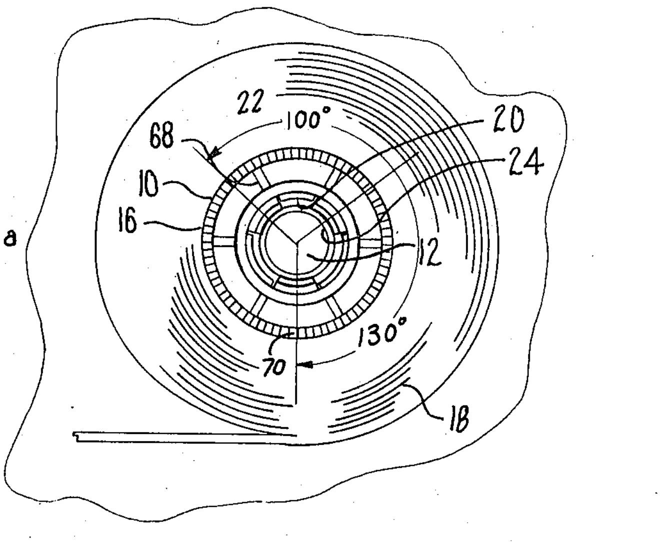
FIG. 4 is an end view of the improved core and supporting structure.

The construction of the core 10 and the spud 12, and their inter-operation are shown in greater detail in the views in FIGS. 3 and 4. In FIG. 3 the core 10 is shown positioned on the spud 12, such that the tabs 24 on the spud engage the periphery 20*a* of the bore thereby locking the core on the spud.

The prongs 25 are slightly flared in an outward direction such that the restraining effect of the core causes a flexure in the prongs which increases the friction between core and spud and prevents unrestrained rotation of the core. In this manner the tape is prevented from unnecessary unwinding in the marking gun.

As shown in FIG. 3 the bore 20 is not of continuous diameter through the core but has a concentric enlarged portion 64 to accommodate the tabs 24. This feature insures that the tape supply is inserted properly and is not inserted such that the tape is inverted at the printing plate.

The end view of FIG. 4 illustrates the one position that both spud 12 and core 10 are coincident during rotation of the core. As illustrated, the angular separation of the equal sized keyways 22 and coincident tabs 24 are 100° and 130°. However, the particular angles of the asymetric arrangement are unimportant.

In FIG. 4 the radial configuration of the core is apparent comprising the central bore 20 and keyways 22 connected by molded spokes 68 to a V-notched peripheral rim 70 on each edge of the cylindrical outer surface 16. The V-notched rim enables a plurality of cores to be fixedly stacked together on a jig or mandrel for simultaneous winding of the stacked cores.

I claim:

1. An improved core for a roll of adhesive label tape for a tape supply, the core being insertable and rotatable on a spud in a marking gun, said core comprising a cylindrical core having a cylindrical outer support surface for supporting a roll of adhesive label tape and having an axially concentric inner bore with three keyways asymmetrically disposed around the periphery of the bore, the core being adapted to cooperate with the spud mounted in the marking gun, the spud comprising a spindle having a distal end with three projecting tabs coincident with the three keyways in the core when the core is selectively oriented with respect to the spud, coincident orientation occurring only once during a complete revolution of the core with respect to the spud, the tabs collectively forming a flange for retaining the core on the spud once the core is inserted thereon.

2. An improved tape supply insertable and rotatable on a spud in a marking gun comprising a roll of adhesive label tape and a core having a cylindrical outer surface on which said roll is supported and having an axially concentric inner bore with three keyways asymmetrically disposed around the periphery of the bore, the core being adapted to cooperate with the spud mounted in the marking gun, the spud comprising a spindle having a distal end with three projecting tabs coincident with the three keyways in the core when the core is selectively oriented with respect to the spud, coincident orientation occurring only once during a complete revolution of the core with respect to the spud, the tabs collectively forming a flange for retaining the core on the spud once the core is properly oriented thereon.

3. The tape supply of claim 2 in combination with the spud mounted in the marking gun.

4. The tape supply of claim 3 wherein said spud comprises three flexible prongs creating an effective outside diameter slightly larger than the diameter of the bore for creating a friction between spud and core to inhibit unrestrained rotation of the core on the spud.

5. The improved core of claim 1 having further a V-notched peripheral rim around each side of the cylindrical outer support surface for interlocking a plurality of cores for simultaneous winding of tape rolls.

* * * * *